(12) United States Patent
Niikura

(10) Patent No.: US 11,455,061 B2
(45) Date of Patent: Sep. 27, 2022

(54) INFORMATION INPUT DEVICE INCLUDING A TOUCH SURFACE AND A DISPLAY SURFACE

(71) Applicant: RENESAS ELECTRONICS CORPORATION, Tokyo (JP)

(72) Inventor: Kentarou Niikura, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 17/177,961

(22) Filed: Feb. 17, 2021

(65) Prior Publication Data

US 2021/0165551 A1    Jun. 3, 2021

Related U.S. Application Data

(63) Continuation of application No. 16/595,942, filed on Oct. 8, 2019, now abandoned.

(30) Foreign Application Priority Data

Dec. 3, 2018 (JP) .............................. JP2018-226226

(51) Int. Cl.
*G06F 3/041* (2006.01)
*G06F 3/01* (2006.01)

(52) U.S. Cl.
CPC .......... *G06F 3/04186* (2019.05); *G06F 3/013* (2013.01)

(58) Field of Classification Search
CPC .... G06F 3/04186; G06F 3/013; G06F 3/0418; G06F 3/0488

See application file for complete search history.

(56) References Cited

U.S. PATENT DOCUMENTS 8,884,928 B1  11/2014  Baldwin
8,928,619 B1   1/2015  Cho
(Continued)

FOREIGN PATENT DOCUMENTS

EP    2 713 244 A1     4/2014
EP    2849026 A1 *    3/2015  ........... G06F 3/0418
(Continued)

OTHER PUBLICATIONS

Extended European Search Report issued in corresponding European Patent Application No. 19209123.9-1231, dated Mar. 30, 2020.
(Continued)

*Primary Examiner* — Premal R Patel
(74) *Attorney, Agent, or Firm* — McDermott Will & Emery LLP

(57) ABSTRACT

An object of the present invention is to provide an information input device capable of realizing high-precision touch operations. The information input device includes a first surface for displaying input request information, a second surface for inputting input request information, a viewpoint calculator for calculating a viewpoint direction of an input person, and a coordinate corrector for correcting a position input to the second surface into a second position in response to the viewpoint direction of the input person and inputs the input request information on the first surface corresponding to the second position. The information input device further provides a storage device for holding distance information on distance between the first surface and the second surface.

13 Claims, 15 Drawing Sheets

(56) References Cited

U.S. PATENT DOCUMENTS

| | | |
|---|---|---|
| 9,280,234 B1 | 3/2016 | Froment et al. |
| 10,705,650 B2 | 7/2020 | Osugi |
| 2011/0285657 A1 | 11/2011 | Shimotani et al. |
| 2015/0153902 A1 | 6/2015 | Suzuki et al. |
| 2016/0196002 A1 | 7/2016 | Kuge et al. |
| 2017/0139535 A1 | 5/2017 | Files et al. |
| 2018/0101276 A1 | 4/2018 | Hanari |

FOREIGN PATENT DOCUMENTS

| | | | | |
|---|---|---|---|---|
| JP | 11-296304 A | | 10/1999 | |
| JP | 2009110275 A | * | 5/2009 | ............ G06F 3/012 |
| JP | 2017-191563 A | | 10/2017 | |
| JP | 2017-199062 A | | 11/2017 | |
| JP | 2018-060404 A | | 4/2018 | |
| WO | 2014/147715 A1 | | 9/2014 | |

OTHER PUBLICATIONS

U.S. PTO Non-Final Office Action issued in related parent U.S. Appl. No. 16/595,942, dated Jul. 7, 2020.
U.S. PTO Final Office Action issued in related parent U.S. Appl. No. 16/595,942, dated Nov. 25, 2020.
Related parent U.S. Appl. No. 16/595,942, filed Oct. 8, 2019.
European Office Action issued in corresponding European Patent Application No. 19209123.9-1231, dated Feb. 21, 2022.
Japanese Notice of Reasons for Refusal issued in corresponding Japanese Patent Application No. 2018-226226, dated Apr. 19, 2022, with English translation.

* cited by examiner

INFORMATION INPUT DEVICE INCLUDING A TOUCH SURFACE AND A DISPLAY SURFACE

CROSS-REFERENCE TO RELATED APPLICATIONS

This is a Continuation of U.S. patent application Ser. No. 16/595,942, filed on Oct. 8, 2019, which claims benefit of Japanese Patent Application No. 2018-226226 filed on Dec. 3, 2018 including the specification, drawings and abstract is incorporated herein by reference in their entirety.

BACKGROUND

The present disclosure relates to an information input device, and more particularly, the present disclosure is applicable to an information input device including a touch surface and a display surface.

There is a display device with a touch detection function that enables information input by mounting a touch detection device such as a touch panel on a display screen of a display device such as a liquid crystal display device, or integrating a touch detection device and a display screen of a display device to display various button images for information input on a display screen of a display device. Such a display device with a touch detection function is used in, for example, a portable information terminal such as a tablet-type computer or a smart phone, a car navigation device, a game machine, a vending machine, an electronic bulletin board machine, and the like. For example, there are Japanese Patent Document, JP-A-2017-199062, JP-A-2018-60404 disclosed.

SUMMARY

In a display device with a touch detection function, a touch surface on which touch detection is performed and a display surface on which button images and the like are displayed are different from each other. That is, in terms of the structure of the device, the touch surface and the display surface do not necessarily coincide with each other in the depth direction, i.e., the direction perpendicular to the display surface. For this reason, depending on the device structure and the viewpoint of the operator, "the position (expected value) of the finger with respect to the display surface viewed from the operator" and "the coordinates (detected value) of the touch point detected by the touch device" may not coincide with each other. In particular, the deviation between the expected value and the detected value increases as the straight line connecting the viewpoint of the operator and the finger of the operator deviates from the perpendicular to the display surface. This deviation may cause discomfort and stress to the operator.

Further, when the touch surface is formed of a curved surface, when a protective panel is provided on the touch surface, or when there is a space or a layer for radiating heat or absorbing shock between the display surface and the touch surface, the deviation between the expected value and the detected value becomes larger as the finger and the display surface are separated from each other, and there is a possibility that the operation is uncomfortable or hindered.

It is an object of the present disclosure to provide an information input device capable of realizing high-precision touch operations.

Other objects and novel features will become apparent from the description of this specification and the accompanying drawings.

An outline of representative ones of the present disclosure will be briefly described below.

That is, the information input device includes a first surface for displaying input request information, a second surface for inputting input request information, a detector for detecting a viewpoint of an input person, and a corrector for converting information input to the second surface into information of the first surface in response to a detected viewpoint of the input person.

According to the above-mentioned information input device, it is possible to realize high-precision touching operations.

BRIEF DESCRIPTION OF THE DRAWINGS

FIG. 13 is viewed from above.

DETAILED DESCRIPTION

Figure 1:
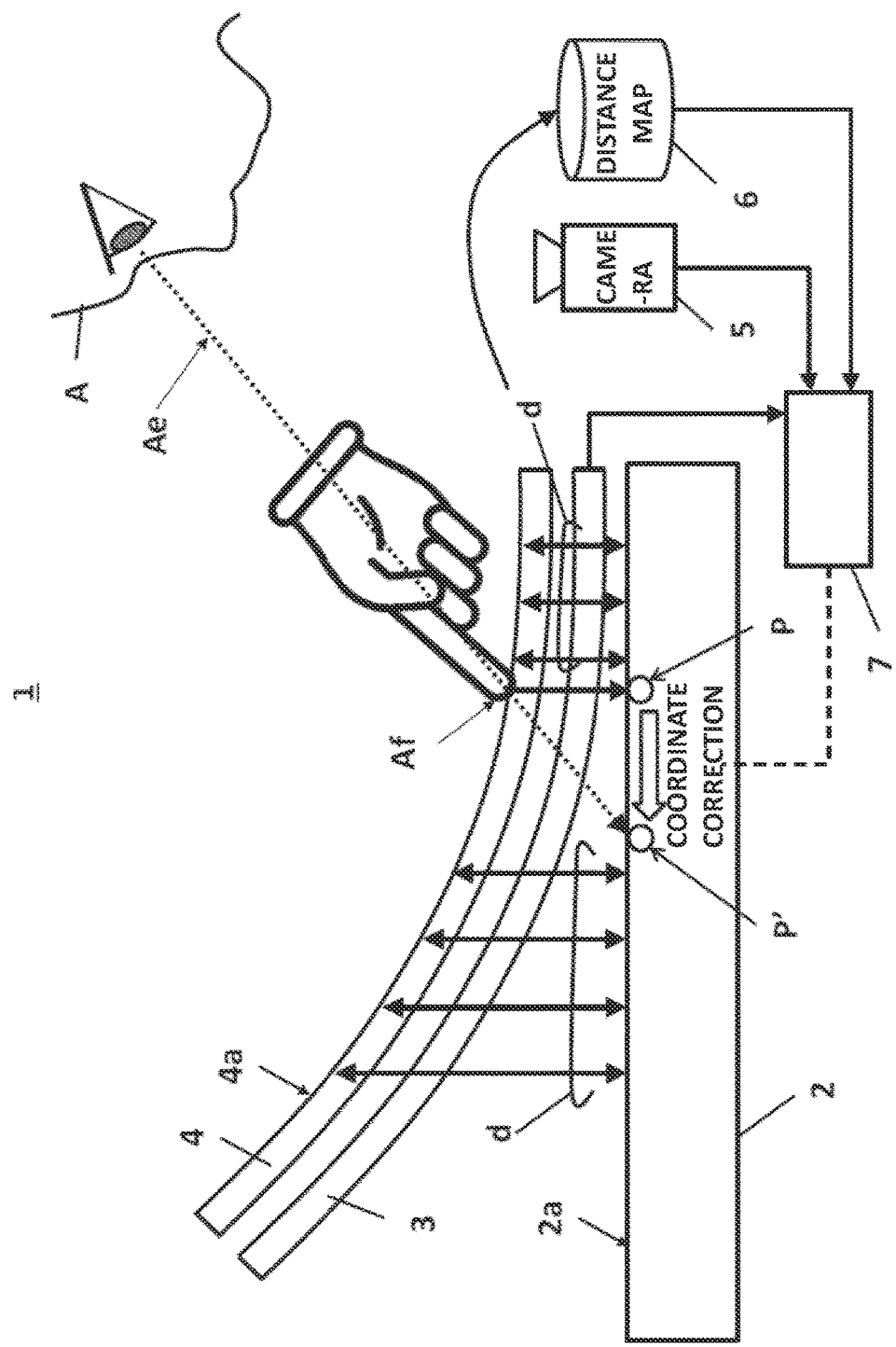
FIG. 1 is a diagram illustrating a schematic configuration of an information input device according to an embodiment.

Those Embodiments will be described below with reference to the drawings. However, in the following description, the same components are denoted by the same reference numerals, and a repetitive description thereof may be omitted. It should be noted that the drawings may be represented schematically in comparison with actual embodiments for the sake of clarity of explanation, but are merely an example and do not limit the interpretation of the present invention.

FIG. 1 is a diagram illustrating a schematic configuration of an information input device according to an embodiment of the present invention. The information input device 1 includes a display device 2, a touch detection device 3, a protective layer 4, a detector 5, a storage device 6, and a corrector 7.

The display device 2 has a display surface 2a for displaying input request information. The display device 2 can be configured by, for example, a display device such as a liquid crystal display device or an organic electroluminescence display device. The input request information may be, for example, a button, an icon, or a character string indicating a link destination.

The touch detection device 3 is a device for detecting touch operations by fingers or pens. The touch detection device 3 can be configured by a touch panel, a touch sensor, a touch device, or the like.

The protection layer 4 is a protective layer for protecting the touch detection device 3. The protection layer 4 has a touch-sensitive surface (second surface) 4a for inputting input request information. The protection layer 4 can be made of acrylic resin, glass, or the like. The touch detection device 3 detects the position Af of the operator A's finger with respect to the touch surface 4a. In this case, the touch coordinate P corresponds to the actual detection values detected by the touch detection device 3.

The detector 5 detects the direction Ae of the viewpoint of the operator A and the position of the face or eyes of the operator A. The detector 5 can be composed of an imaging device such as cameras.

The storage device 6 is a storage unit that holds in advance the distance information d of a plurality of points between the touch surface 4a and the display surface 2a as a distance map. The storage device 6 can be configured by a nonvolatile storage device such as an EEPROM, an EPROM, a ROM, or a flash memory, for example. The distance information d may be generated in advance as a design value at the time of design of the information input device 1 and stored in the storage device 6.

The corrector 7 corrections the touch coordinates P detected by the touch detection device 3 to the touch coordinates P' based on the information of the viewpoint (face or eye position) of the operator acquired by the detector 5 and the distance information d of the touch surface 4a and the display surface 2a from the storage device 6. The touch coordinate P' is input to the system provided with the information input device 1. The touch coordinate P' is the touch coordinate (expected value) seen from the operator A.

Next, the operation of the information input device 1 will be described. Buttons are displayed at the position of the coordinate P' on the display surface 2a of the display device 2.

When pressing the button displayed at the position of the coordinate P', the operator A first points the line of sight to the button, and then presses the touch surface 4a with the fingertip. In this case, generally, a button is displayed on the extension line of the direction Ae from the viewpoint of the operator A, and the fingertip is moved to the position of the button. Therefore, the position Af of the fingertip of the operator A is also on the extension line of the direction Ae from the viewpoint of the operator A.

Here, as shown in FIG. 1, when the touch surface 4a is separated from the display surface 2a and the direction Ae of the line of sight of the operator A is inclined from the perpendicular direction of the display surface 2a, even if the operator A attempts to press the buttons displayed at the position of the coordinate P', the touch detection device 3 detects the position Af of the fingertip of the operator A as the coordinate P. Therefore, the operator A cannot select the button displayed at the position of the coordinate P'.

In an embodiment, the corrector 7 corrections the touch coordinates P detected by the touch detection device 3 to the touch coordinates P' based on the information of the viewpoint (face/eye position) of the operator acquired by the detector 5 and the distance information d from the storage device 6. As a result, a touch operation with high accuracy can be realized. In addition, the uncomfortable feeling and stress on the operator can be solved. In addition, even when the touch surface is formed of a curved surface, the possibility of causing a sense of discomfort or trouble in the operation can be reduced.

Embodiment 1

Figure 2:
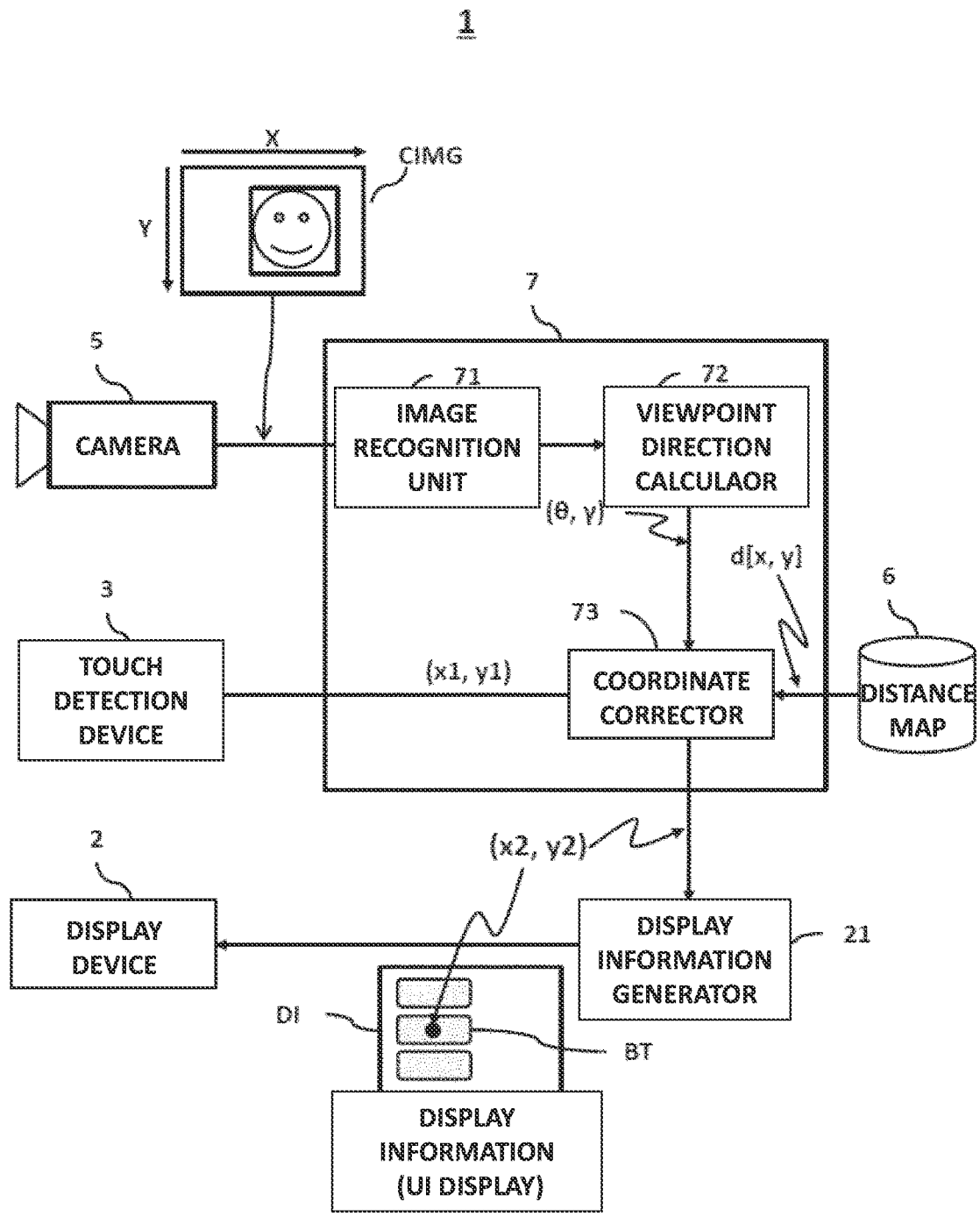
FIG. 2 is a diagram illustrating the configuration of the information input device according to Embodiment 1.
Figure 3:
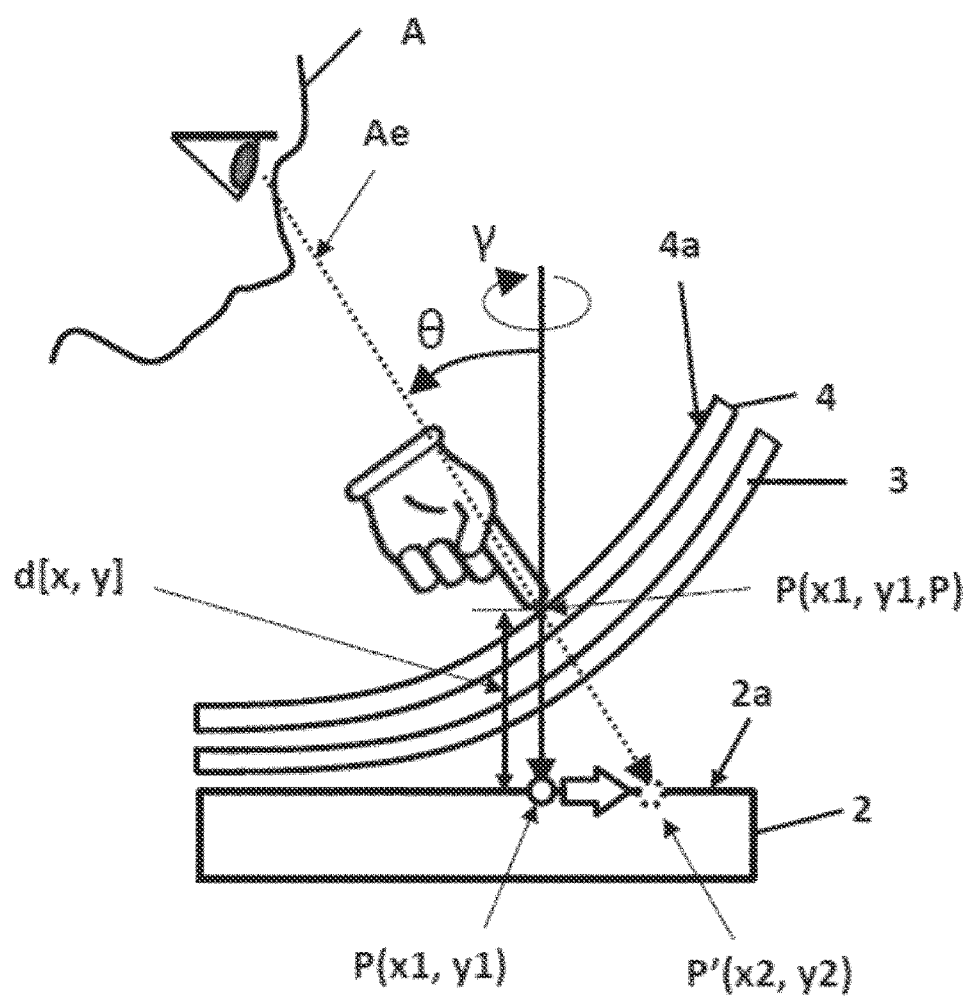
FIG. 3 is a diagram illustrating an example of an operator's input condition.

FIG. 2 is a diagram illustrating the configuration of the information input device according to Embodiment 1. FIG. 3 is a diagram illustrating an example of an input condition of an operator.

The information input device 1 includes a display device 2, a display information generator 21, a touch detection device 3, a detector 5, a storage device 6, and a corrector 7. The corrector 7 includes an image recognition unit 71, a viewpoint direction calculator 72, and a coordinate corrector 73. The protection layer 4 is omitted. The display device 2, the touch detection device 3, the detector 5, and the storage device 6 are the same as those in the embodiment, and their descriptions are omitted.

The image recognizing unit 71 receives captured image CIMG of the face, eyes, and the like of the operator A from the detector 5. The captured image CIMG is configured by, for example, a horizontal coordinate X and a vertical coordinate Y, and a plurality of pixels constituting the image can be identified by the horizontal coordinate X and the vertical coordinate Y. The image recognition unit 71 detects the face, eyes, and the like of the operator A from the captured image CIMG, and extracts coordinate information of the face and eyes on the image. By this coordinate information, coordinate information of the center of the face or eye and information of the size of the face or eye can be obtained. In order to determine the position of the face of the operator A in the space, the distance (depth) may be determined from the size of the face in the input image from the camera in the case of a monocular camera. In addition, a technique capable of simultaneously obtaining image information of an object and distance information of the object, such as a ToF (Time of Flight) camera, may be used. In addition, a method other than the camera (infrared ray, voice, ultrasonic wave, or the like) may be used, or a method other than the camera (voice, ultrasonic wave, or the like) and the camera may be used in combination.

The viewpoint direction calculator 72 receives the coordinate information of the face and the eyes on the image from the image recognition unit 71, and calculates the viewpoint direction of the operator from the coordinate information of the face and the eyes. For example, in the case of the condition shown in FIG. 3, the viewpoint direction calculator 72 calculates the viewpoint direction of the operator A as an azimuth angle ($\gamma$) and an elevation angle ($\theta$). The azimuth angle ($\gamma$) and the elevation angle ($\theta$) calculated by the viewpoint direction calculator 72 are input to the coordinate corrector 73 as ($\theta$, $\gamma$).

The coordinate corrector 73 refers to the distance map stored in the storage device 6 based on the touch coordinates P detected by the touch detection device 3, and obtains the distance information d between the touch surface 4a and the display surface 2a. For example, in the condition shown in FIG. 3, the coordinate corrector 73 refers to the distance map stored in the storage device 6 based on the touch coordinates P(x1, y1) detected by the touch detection device 3, and obtains the distance information d(x1, y1) between the touch surface 4a and the display surface 2a. In this specification, for the touch coordinates P(x1, y1) and the distance information d(x1, y1) between the touch surface 4a and the display surface 2a, the spatial coordinates of the operator A's fingers with respect to the display surface 2a are represented as (x1, y1, d). The coordinate corrector 73 calculates a point P' (x2, y2) on the display surface 2a obtained by extending the spatial coordinates (x1, y1, d) of the operator's fingers from the viewpoint directions (θ, γ) of the operator A as the coordinates after correction.

Based on the correction coordinate point P' (x2, y2), the display information generator 21 selects the input request information (buttons) BT to be displayed on the coordinates (x2, y2) in the display information DI of the display device 2. Thus, the input request information (button) BT intended by the operator A can be selected without causing the operator A to feel discomfort and stress.

Next, an example of a method of calculating the azimuth angle (γ) and the elevation angle (θ) by the viewpoint direction calculator 72 will be described.

Figure 4:
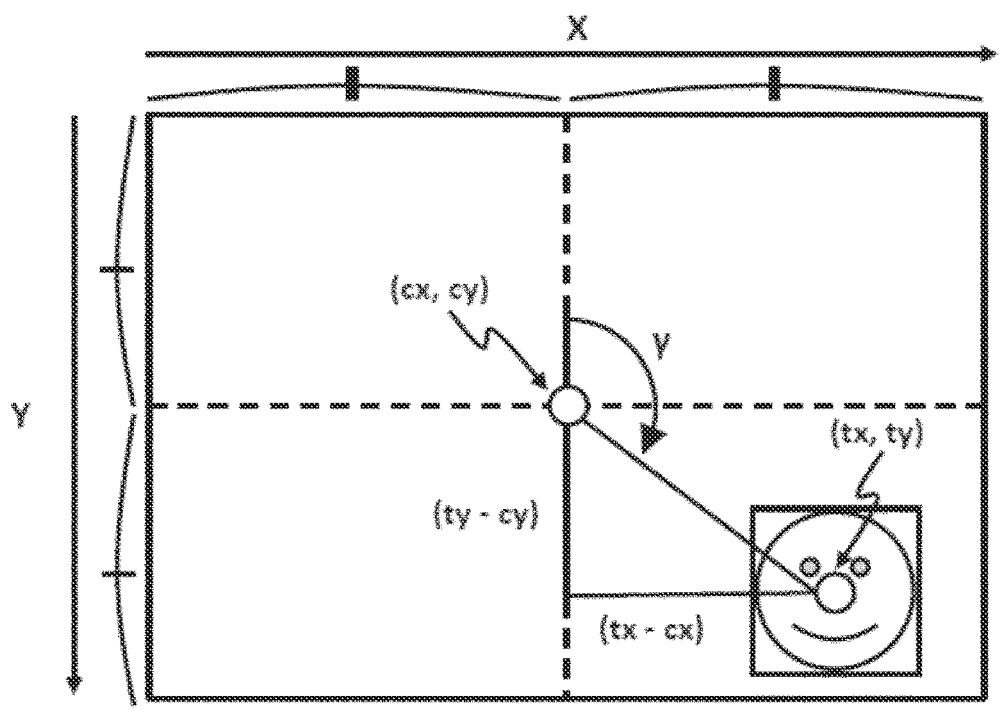
FIG. 4 is a diagram illustrating the calculation method of azimuth angle ($\gamma$).
Figure 5:
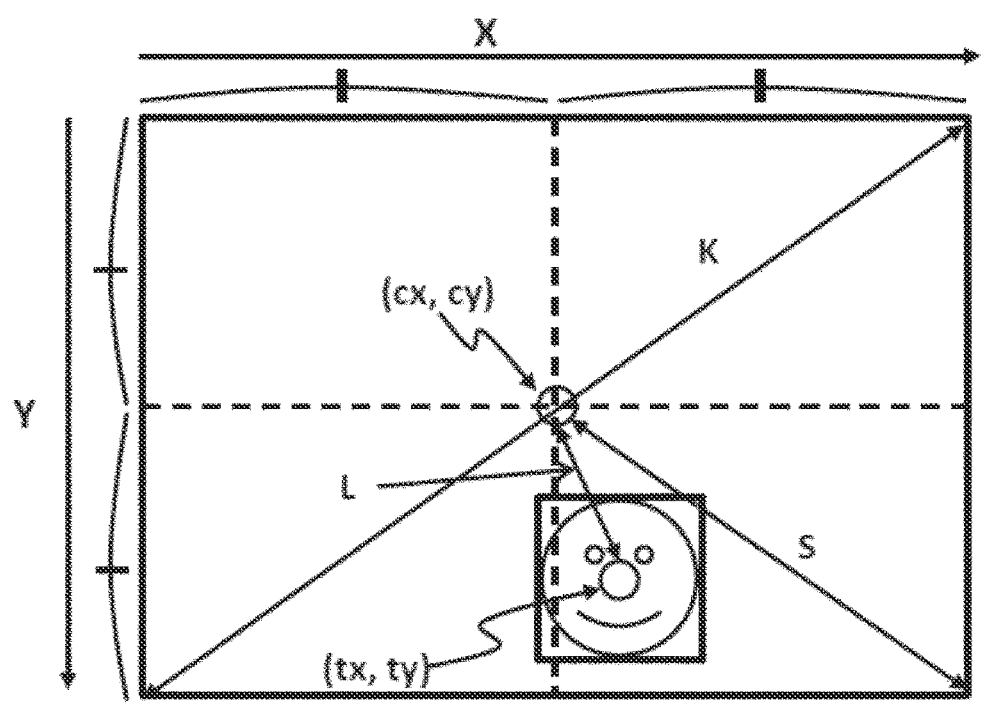
FIG. 5 is a diagram illustrating the calculation method of the elevation angle ($\theta$).
Figure 6:
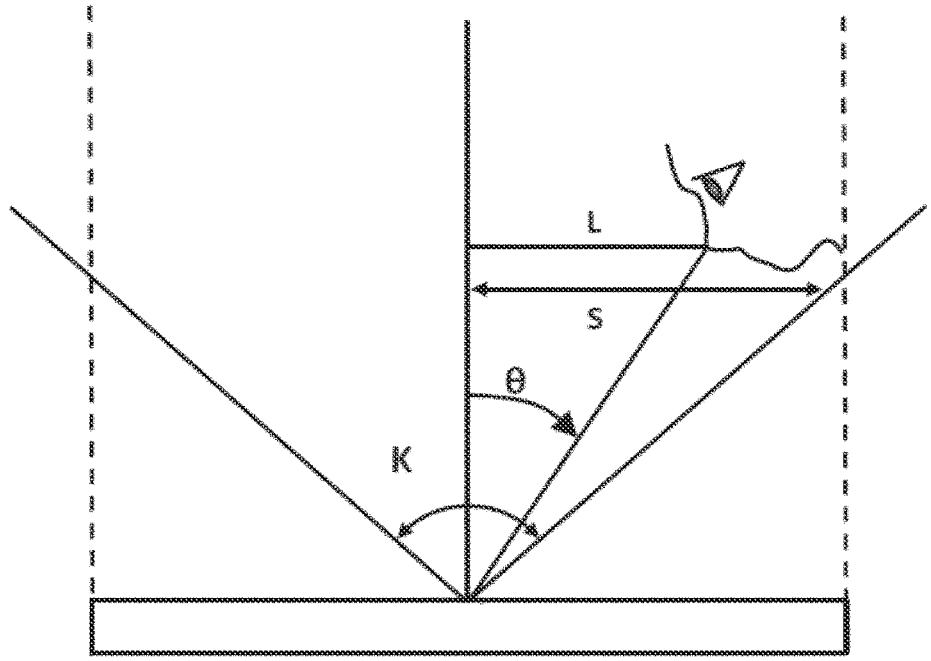
FIG. 6 is another diagram illustrating the calculation method of the elevation angle ($\theta$).

FIG. 4 is a diagram illustrating a method of calculating the azimuth angle (γ). FIGS. 5 and 6 are diagrams illustrating a method of calculating the elevation angle (θ). FIG. 5 shows the plan view of the captured images, and FIG. 6 is a side view of FIG. 5 as viewed laterally. Here, like a smartphone, when the display surface 2a and the camera which is the detector 5 are disposed close to each other, and the normal direction of the display surface 2a and the field of view of the camera (5) are parallel to each other, the calculation of the viewpoint direction can be simplified when the camera (5) is also approximated to exist at the center of the display surface 2a.

First, it is assumed that the captured image shown in FIG. 4 or FIG. 5 is input from the camera (5) to the image recognition unit 71 in response to the touch operation of the operator A. The image recognition unit 71 extracts coordinate information (center and size) of the face or eye of the operator A from the captured image. The viewpoint direction calculator 72 obtains the direction (azimuth angle (γ)) of the center coordinates (tx, ty) of the "face" or the "eyes" from the center (cx, cy) of the captured image, and a value (elevation angle (θ)) obtained by converting the distance into an angle. This can be converted (approximated) to information indicating the direction of the faces and eyes with respect to the viewing surface 2a, for example, by the following equation:

Referring to FIG. 4, the azimuth angle (γ) can be obtained by the following equations (1) and (2). γ≈a tan((ty−cy)/(tx−cx)×180×PI (Equation 1)=a tan((ty−cy)/(tx−cx)×180×PI+180 (Equation 2), where Equation 1 is the equation when (tx−cx) is positive and Equation 2 is the equation when (tx−cx) is negative. PI is the circumference factor.

Referring to FIGS. 5 and 6, the elevation angle (θ) can be obtained by the following Equation 3. θ≈(K±2)×L÷S, were, as shown in FIGS. 5 and 6, K is the diagonal angle of view of the camera. L indicates the distance between the center (cx, cy) of the captured image and the center coordinates (tx, ty) of the "face" or "eyes". S is the distance between the center of the captured image (cx, cy) and the corner of the captured image.

Next, an exemplary method of calculating the distance information D between the touch surface 4a and the display surface 2a by the coordinate corrector 73 will be described. Here, calculation examples will be described in which distance information (distance map) of the display surface 2a and the touch surface 4a is held in the storage device 6 in the form of meshes.

Figure 7:
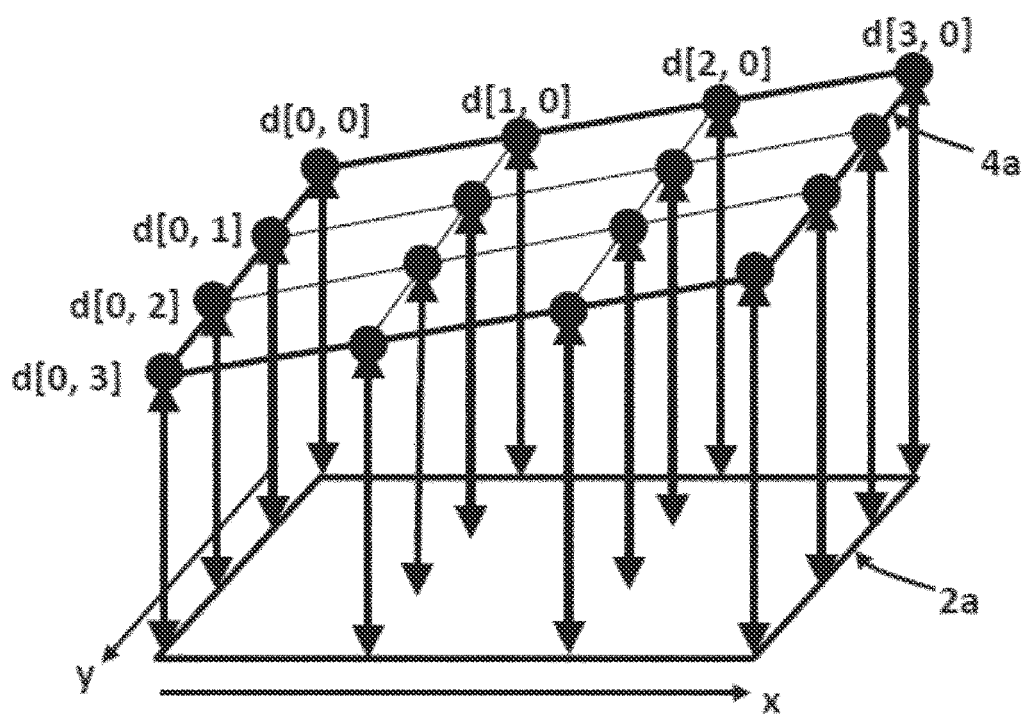
FIG. 7 is a diagram illustrating an example of a distance map stored in a storage device.

FIG. 7 is a diagram illustrating an exemplary distance map stored in the storage device 6. In this embodiment, the storage device 6 holds the distance information of the display surface 2a and the distance information of the touch surface 4a in the form of meshes at four points in the X direction, four points in the Y direction, and a total of 16 points. At the respective mesh-like points d [x, y] (x=0, 1, 2, 3, y=0, 1, 2, 3), the distance information d between the display surface 2a and the touch surface 4a is stored. The distance map stored in the storage device 6 is not limited to FIG. 7. The distance information may be held as a value such as a calculation formula or CAD data.

Figure 8:
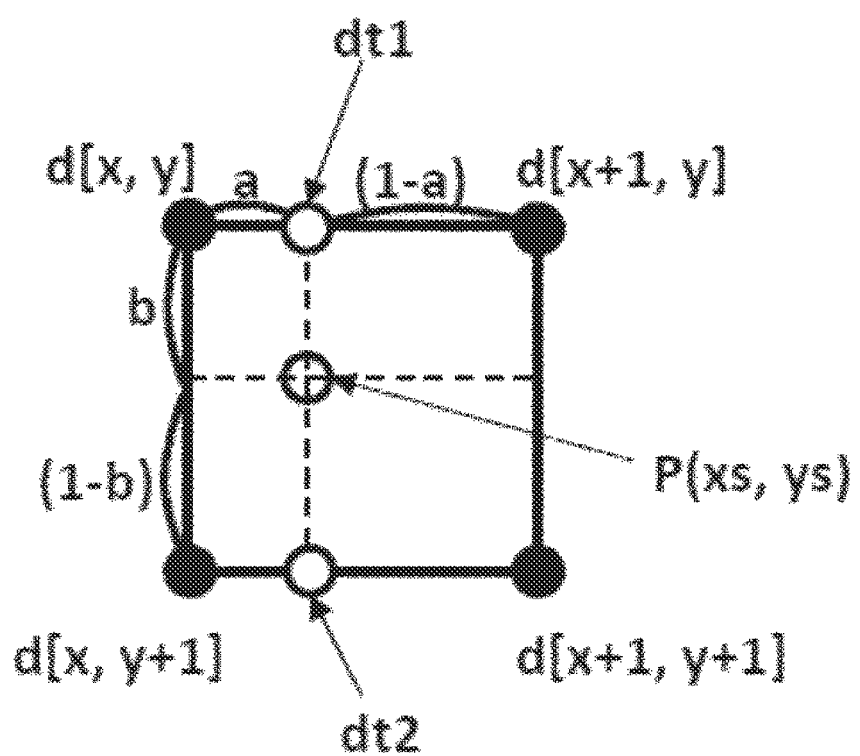
FIG. 8 is a diagram illustrating an example of calculation of an information on distance in a touch coordinate.

FIG. 8 is a diagram illustrating an example of calculation of distance information in touch coordinates. This example shows an example of calculating the distance information when the storage device 6 stores the distance information shown in FIG. 7. In FIG. 8, the operator A touches the touch coordinate P(xs, ys) of the touch surface 4a. In this embodiment, the finger of the operator A touches a rectangular surface composed of four points (d(x, y), d(x+1,y), d(x, y+1), and d(x+1,y+1)) on the touch surface 4a, and the coordinate of the finger is defined as the touch coordinate P(xs, ys).

In this case, the distance information D between the display surface 2a and the touch surface 4a corresponding to the touch coordinate P(xs, ys) can be calculated by the following Equation 4. D={dt1×(1−b)}+{dt2×b}={(d[x,y]×(1−a)+d[x+1,y]×a)×(1−b)}+{(d[x,y+1]×(1−a)+d[x+1,y+1]×a)×b} (Equation 4) Next, a process for correcting the touch coordinates P(x1, y1, D) to the coordinates P' (x2, y2, 0) of the touch point seen by the operator A using the viewpoint directions (θ, y) obtained by Equations 1 to 3 and the distance information D obtained by Equation 4 will be explained.

Figure 9:
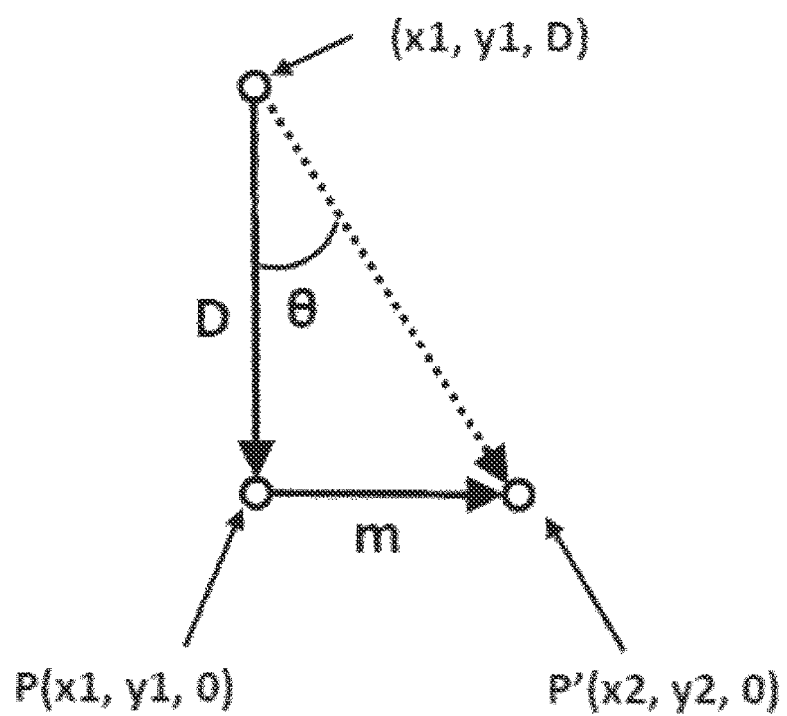
FIG. 9 is a diagram illustrating a method of correcting the touch coordinate P (x1, y1, D) to the coordinate P' (x2, y2, 0).

FIG. 9 is a diagram illustrating a method of correcting the touch coordinates P(x1, y1, D) to the coordinates P' (x2, y2, 0). Here, the touch coordinates P(x1, y1, D) indicate spatial coordinates on the touch surface 2a of the finger of the operator A. The coordinates P' (x2, y2, 0) indicate the spatial coordinates of the display surface 2a when viewed from the operator A. The coordinates P(x1, y1, 0) are coordinates before parallax correction, and the coordinates P' (x2, y2, 0) are coordinates after parallax correction.

The coordinates P(x1, y1, D) can be corrected to the coordinates P' (x2, y2, 0) by the following Equation 5-Equation 7. m=D×sin (θ)/cos (θ) (Equation 5) x2=m×cos (γ)+x1 (Equation 6) y2=m×sin (γ)+y1 (Equation 7). Here, m is a moving distance on the display surface 2a when parallax is considered.

According to Embodiment 1, the corrector 7 performs coordinate correction of the touch coordinates P on the touch surface 4a detected by the touch detection device 3 to the touch coordinates P' on the display surface 2a based on the information (azimuth angle (γ) and elevation angle (θ)) of the viewpoint (face or eye position) of the operator acquired by the detector 5 and the distance information d from the storage device 6. As a result, a touch operation with high accuracy can be realized. In addition, the uncomfortable feeling and stress on the operator can be solved. In addition, even when the touch surface is formed of a curved surface, the possibility of causing a sense of discomfort or trouble in the operation can be reduced.

Embodiment 2

Figure 10:
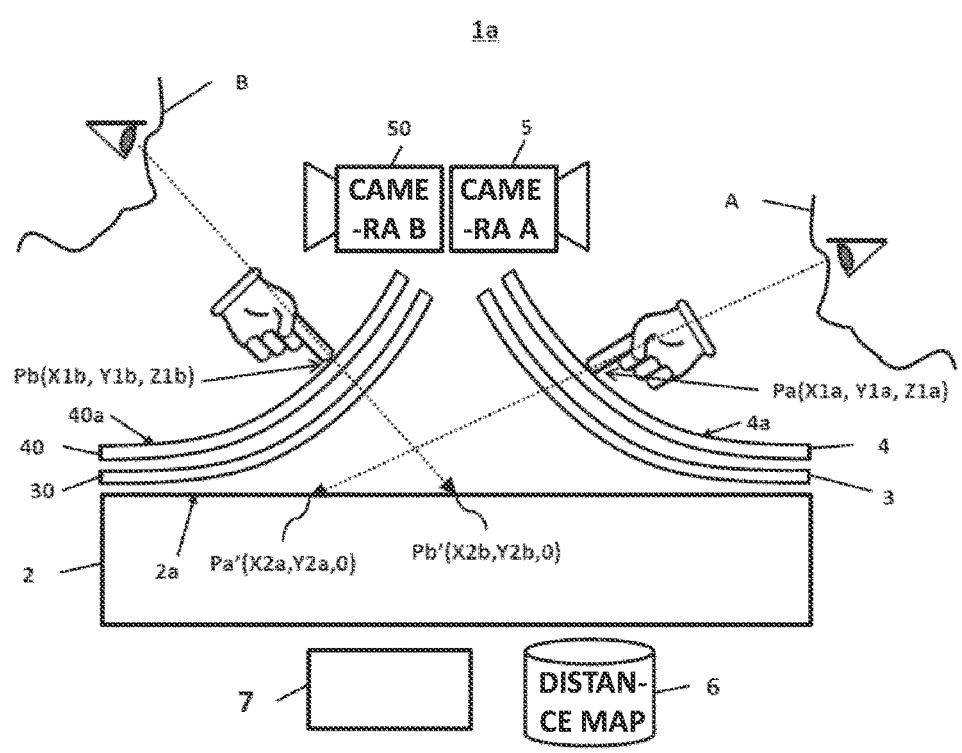
FIG. 10 is a schematic diagram illustrating the configuration of the information input device according to Embodiment 2.

FIG. 10 is a diagram illustrating a schematic configuration of an information input device according to Embodiment 2. The information input device 1a shown in FIG. 10 is an application of an embodiment or Embodiment 1. FIG. 10 differs from FIG. 1 in that the touch detection device 30, the protection film 40 including the touch surface 40a, and the detector 50 are provided in FIG. 10. That is, the information input device 1a shown in FIG. 10 includes a plurality of touch detection device 3 and 30 provided for one display device 2, and a plurality of detector (cameras A and B) 5 and 50 for detecting a plurality of operators, and enables, for example, a touch input from the operator A to the touch detection device 3 and a touch input from the operator B to the touch detection device 30.

The storage device 6 stores a distance map including distance information d of a plurality of points between the touch surface 4a and the display surface 2a, and a distance map including distance information d of a plurality of points between the touch surface 40a and the display surface 2a.

The detector (camera A) 5 is a unit for detecting the direction of the viewpoint of the operator A and the positions of the faces and eyes of the operator A. The detector (camera B) 50 is a unit for detecting the direction of the viewpoint of the operator B and the positions of the faces and eyes of the operator B.

The corrector 7 performs coordinate correction on the touch coordinates Pa(X1a, Y1a, Z1a), Pb(X1b, Y1b, Z1b) detected by the touch detection device 3, 30 to the touch coordinates Pa' (X2a, Y2a, 0) and Pb' (X2b, Y2b, 0) based on the information of the viewpoints (positions of faces and eyes) of the operators A, B acquired by the detector 5, 50 and the distance information d of the touch surface 4a, 40a, and the display surface 2a from the storage device 6. That is, in the information input device 1a, the touch coordinates Pa (X1a, Y1a, Z1a) of the operator A's finger on the touch surface 4a are corrected to the touch coordinates Pa' (X2a, Y2a, 0) on the display surface 2a of the display device 2 in the same manner as in the embodiment or Embodiment 1. The touch coordinates Pb (X1b, Y1b, Z1b) of the operator B's finger on the touch surface 40a are corrected to the touch coordinates Pb' (X 2 b, Y 2 b, 0) on the display surface 2a of the display device 2. The rest of the configuration is the same as that of the embodiment or the Embodiment 1, and therefore the explanation thereof is omitted.

Figure 11:
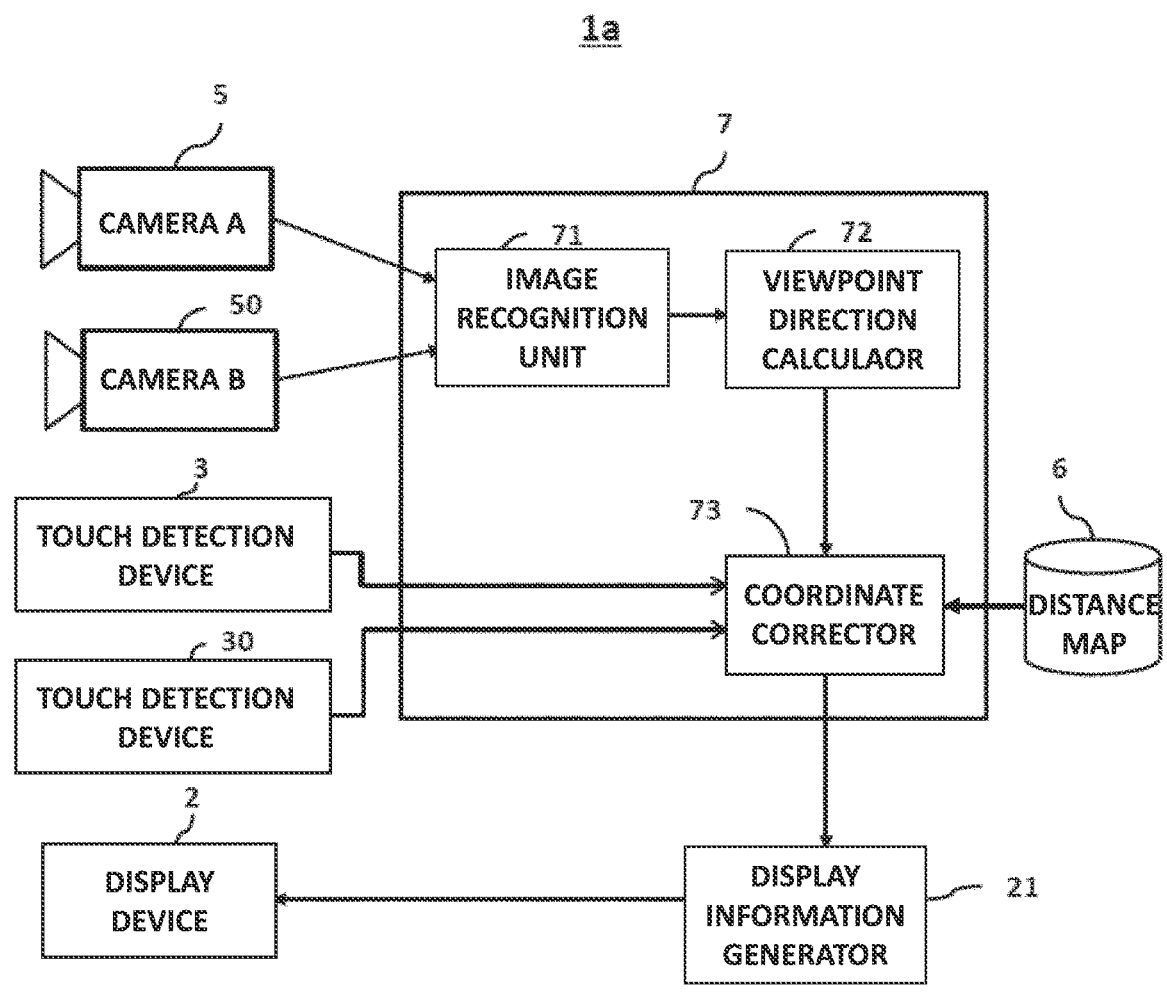
FIG. 11 is a diagram illustrating an exemplary configuration of an information input device according to Embodiment 2.

FIG. 11 is a diagram illustrating an exemplary configuration of an information input device according to Embodiment 2. The information input device 1a shown in FIG. 11 differs from that shown in FIG. 1 in that, in FIG. 11, a captured image of the detection device 50 is input to the image recognition unit 71, and the detection result of the touch detection device 30 is input to the coordinate corrector 73. The rest of the configuration is the same as that of FIG. 2, and a description thereof will be omitted.

In addition to the function of extracting the coordinate information of the face and eyes of the operator A described in Embodiment 1, the image recognition unit 71 also has a function of performing a recognition function for the captured image of the detector (camera B) 50 and extracting the coordinate information of the face and eyes of the operator B on the image.

The viewpoint direction calculator 72 has a function of calculating the viewpoint direction of the operator A as an azimuth angle (γ) and an elevation angle (θ), and a function of calculating the viewpoint direction of the operator B as an azimuth angle (γ) and an elevation angle (θ).

The coordinate corrector 73 has a function of correcting the touch coordinates Pa (X1a, Y1a, Z1a) of the finger of the operator A to the touch coordinates Pa' (X2a, Y2a, 0) on the display surface 2a of the display device 2, and also a function of correcting the touch coordinates Pb (X1b, Y1b, Z1b) of the finger of the operator B on the touch surface 40a to the touch coordinates Pb' (X2b, Y2b, 0) on the display surface 2a of the display device 2. Therefore, the plurality of detectors (cameras A and B) 5 and 50 serve as an identifying unit for identifying whether the input is an input of the operator A or an input of the operator B.

Although the corrector 7 in FIG. 11 is shared by the touch detection device 3, the detector 5, the touch detection device 30, and the detector 50, the configuration of the corrector 7 is not limited to FIG. 11. For example, two correctors 7 may be provided, one corrector may be assigned to the touch detection device 3 and the detector 5, and the other corrector may be assigned to the touch detection device 30 and the detector 50.

According to Embodiment 2, it is possible to provide an information input device in which a plurality of operators A and B can access a single display device (display surface 2a) without interfering with each other's operations, by inputting on a complicated touch surface and considering parallaxes. In the system including the information input device of Embodiment 2, it is possible to realize the multi-touch control by identifying and grasping which of the operations of the operator A and the operator B is.

Although the identification of the touch operation by a plurality of fingers can be performed by a multi-touch technique, there has been a problem that it is impossible to determine which touch is which touch. In systems utilizing the information input device 1a of the present Embodiment, the touch surface can be separated and identified for each operator. Therefore, even if the touch operation is performed on the same display device, the system can provide desired services while the system grasps who the touch operation is performed.

In addition, the corrector 7 performs coordinate correction of the touch coordinates Pa, Pb detected by the touch detection device 3, 30 to the touch coordinates Pa', Pb' based on the information of the viewpoints of the operators A, B acquired by the detector 5, 50 and the distance information d from the storage device 6. As a result, a touch operation with high accuracy can be realized. In addition, it is possible to eliminate a sense of discomfort and stress on the operators A and B. In addition, even when the touch surface is formed of a curved surface, the possibility of causing a sense of discomfort or trouble in the operation can be reduced.

Embodiment 3

Figure 12:
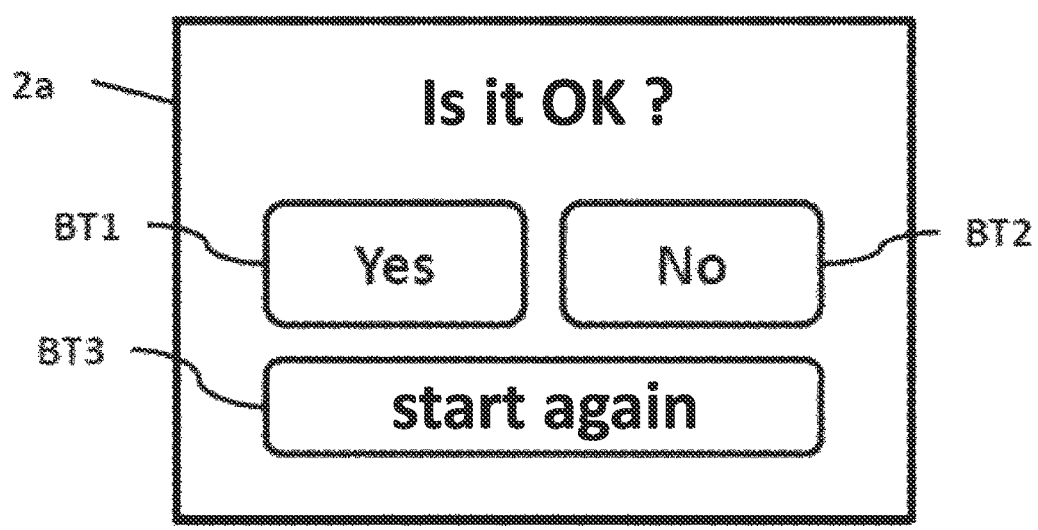
FIG. 12 is a diagram illustrating an exemplary display of a display surface of an information input device according to Embodiment 3.

FIG. 12 is a diagram illustrating an exemplary display of the display surface of the information input device according to Embodiment 3. In the embodiment, Embodiment 1 and Embodiment 2 are configured on the assumption that the finger Af of the operator A touches the touch surface 4a, but the present invention is not limited thereto. For example, a touch surface such as a motion control mounted on a car navigation device may be formed in a part of a normal space of the display surface. That is, the present Embodiment is applied to a non-contact type information input device which does not include a physical touch surface and realizes touch operations from positions of fingers in space by recognizing images of captured images from cameras.

In this instance, the spatial depth of the touch-down determination is changed in response to the content of the input request information displayed on the display surface 2a of the display device 2 by utilizing the distance map held in the storage device 6. As a result, it is possible to provide the operator with improved operability. Further, erroneous input due to erroneous operation can be prevented. Instead of having a fixed distance map in the storage device 6 as in Embodiment 1 to 2, the distance map is dynamically generated from the displayed content, thereby setting the spatial touch surface of the input request information which is likely to be operated by the operator A to a short distance from the operator A. As a result, the operability for the operator A can be improved. On the other hand, a spatial touch surface of the input request information that the operator A does not want to operate much or the input request information that the operator A does not need to operate is set to a long distance with respect to the operator A, thereby suppressing an erroneous operation.

FIG. 12 shows display images on the display surface 2a of the display device 2. In this embodiment, the display screen includes a character string for requesting a reply of "Is it OK?" and the first button BT1, the second button BT2, and the third button BT3 as the input request information. For example, the first button BT1 includes a "yes" display, the second button BT2 includes a "no" display, and the third button BT3 has a "start again" display. The button is an example, and may be a character string, a figure, or an icon.

In the case of the displayed images as shown in FIG. 12, generally, the priority of the use of the first button BT1 and the second button BT2 tends to be higher, and the priority of the use of the third button BT3 is considered to be lower than that of the first button BT1 and the second button BT2. It should be noted that "the priority of use is high" may be referred to as "the operator A wants to operate" and "the priority of use is low" may be referred to as "the operator A wants not to operate too much".

Figure 13:
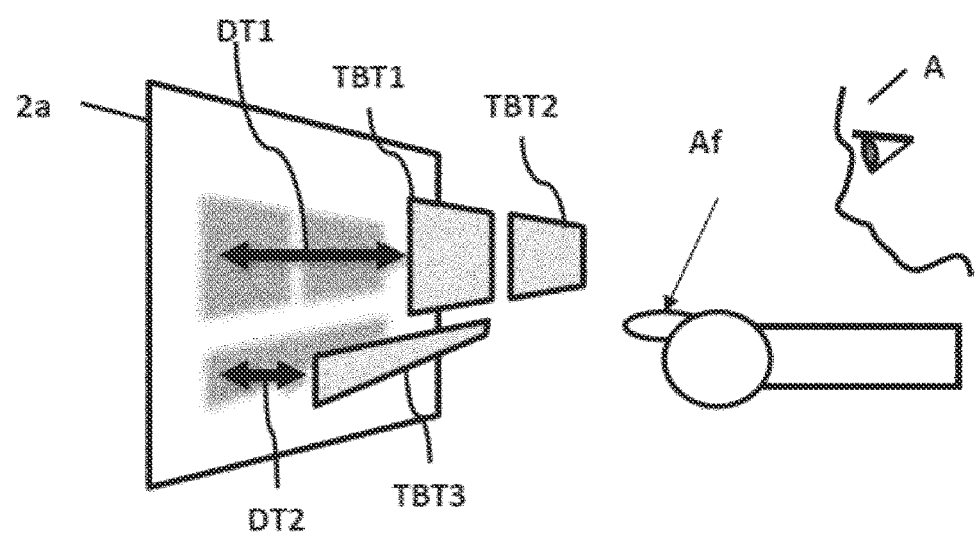
FIG. 13 is a diagram illustrating a spatial touch surface with an awareness of the priority of use.
Figure 14:
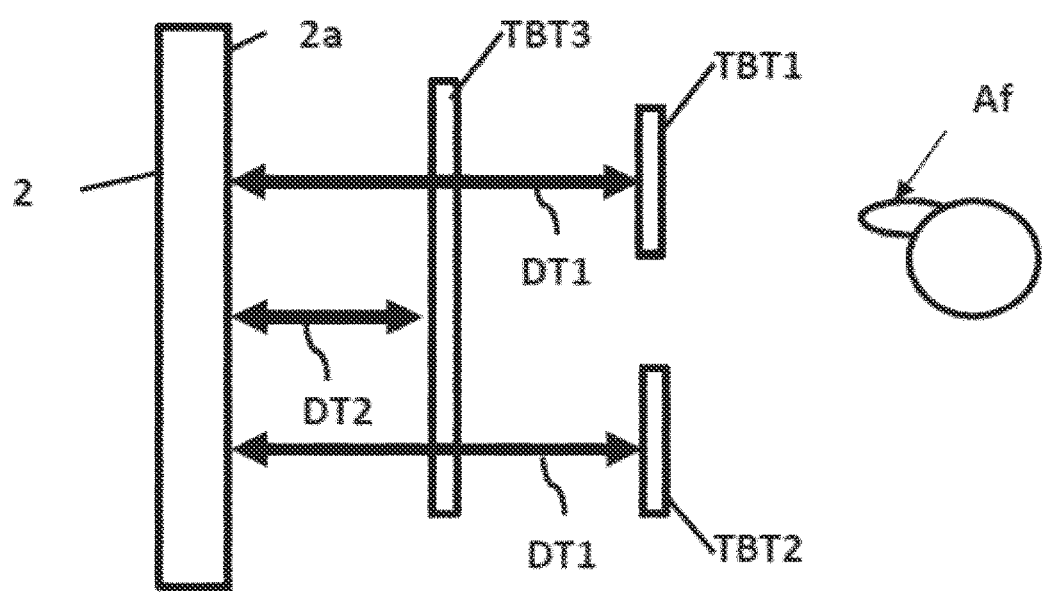
FIG. 14 is a diagram illustrating a spatial touch surface when

FIG. 13 is a diagram illustrating a spatial touch surface in which the use priority is taken into consideration. FIG. 14 is a diagram illustrating a spatial touch surface when FIG. 13 is viewed from above. As shown in FIG. 13 and FIG. 14, the spatial touch surface (first touch surface) TBT1 of the first button BT1 and the spatial touch surface TBT2 of the second button BT2, which are highly prioritized for use, exist in a space of the distance DT1 from the display surface 2a of the display device 2. On the other hand, the spatial touch surface (second touch surface) TBT3 of the third buttons BT3 with the lower usage priorities exists in the space of the distance DT2 from the display surface 2a of the display device 2. The distance DT2 is shorter than the distance DT1 (DT2<DT1). When viewed from the position of the finger Af of the operator A, the spatial touch surface TBT1 of the first button BT1 and the spatial touch surface TBT2 of the second button BT2 are arranged closer to the position of the finger Af of the operator A than the spatial touch surface TBT3 of the third button BT3. Therefore, the operator A is in a state in which the first button BT1 and the second button BT2 are easy to select, and the third button BT3 is difficult to select compared with the first button BT1 and the second button BT2.

Figure 15:
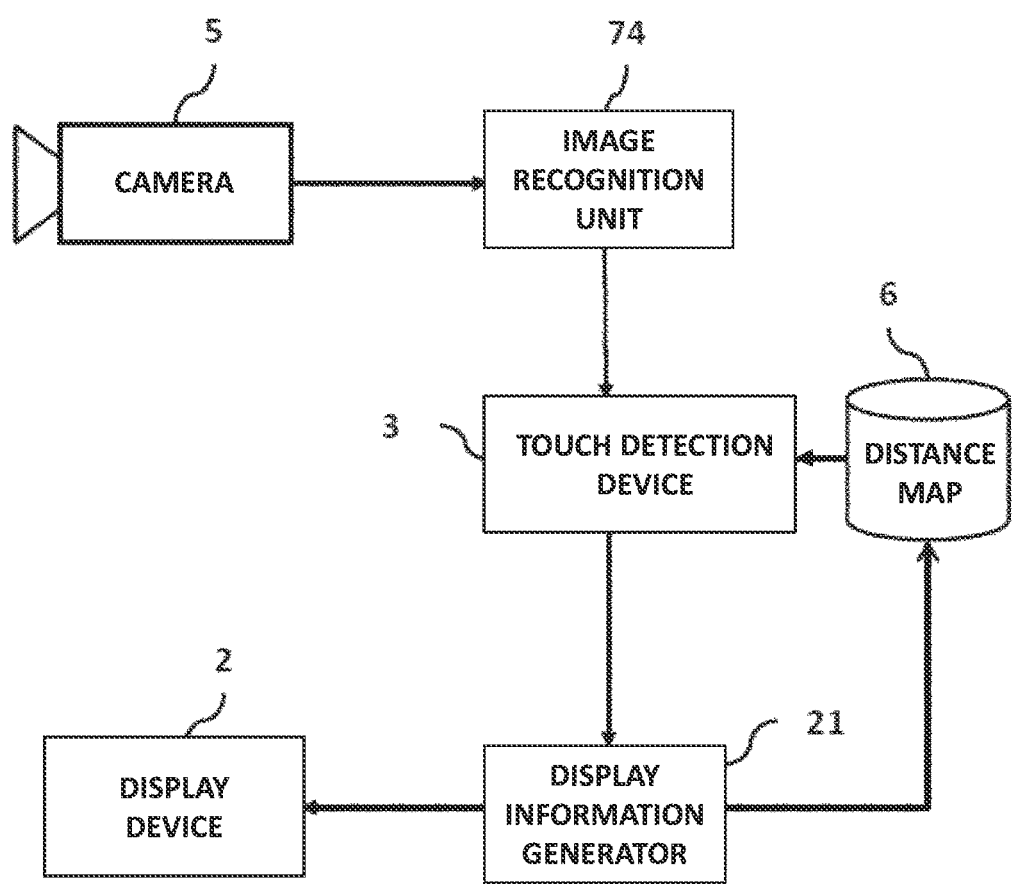
FIG. 15 is a diagram illustrating the configuration of the information input device according to Embodiment 3.

FIG. 15 is a diagram illustrating a configuration of an information input device according to Embodiment 3. The information input device 1b includes a display device 2, a display information generator 21, a touch detection device 3, a detector 5, a storage device 6, and an image recognition unit 74. The detector (camera) 5 is not limited to a camera, and methods other than the camera (infra-red, sound, ultrasonic wave, etc.) may be used.

The detector (camera) 5 photographs the position of the finger Af of the operator A, and inputs the captured image to the image recognition unit 71. The image recognition unit 74 recognizes the coordinate of the position of the finger Af from the captured image, and inputs the finger Af to the touch detection device 3.

The display information generator 21 generates display images to be displayed on the display device 2. Here, it is assumed that the display image includes a character string for requesting a reply of "OK?", a first button BT1, a second button BT2, and a third button BT3 as input request information (first input request information and second input request information), as described with reference to FIG. 12. When the display images include the first button BT1, the second button BT2, and the third button BT3, which are input request information, the display information generator 21 stores distance information (DT1, DT2, and DT3) of the spatial touch surface TBT1, the TBT2, and the TBT3 for the first button BT1, the second button BT2, and the third button BT3 in the storage device 6. The distance information is changed depending on the display images displayed on the display device 2.

The touch detection device 3 determines the first button BT1, the second button BT2, or the third button BT3 selected by the operator A based on the coordinate of the position of the finger Af from the captured image inputted from the image recognition unit 74, and the spatial touch surface TBT1, the TBT2, and the TBT3 distance information (DT1, DT2, and DT3) of the first button BT1, the second button BT2, and the third button BT3 currently displayed in the displayed image. The determination result is input to the display information generator 21. As a result, the display information generator 21 inputs the information of the first button BT1, the second button BT2, or the third button BT3 selected by the operator A to the system including the information input device 1b.

With such a configuration, it is possible to provide the operator with improved operability. Further, erroneous input due to erroneous operation can be prevented.

Embodiment 3 is not limited to the car navigation device. The present invention is also applicable to a head-up display technology for displaying characters, graphics, and the like on a windshield of an automobile. For example, the present invention can be used in a case where a vehicle to be followed is selected from a plurality of vehicles on shield glass in automatic driving or the like, or in a case where a trip meter is changed or reset.

While the invention made by the present inventor has been specifically described above based on the Embodiment, the present invention is not limited to the above-described embodiment and Embodiment, and it is needless to say that the present invention can be variously modified.

APPENDIX

Apx1. An information input device comprising:
a display device including a display surface;
a display information generator that can display first input request information and second input request information on the display surface;
an image recognition unit that recognizes a position of a finger of an input person; and
a touch detection device that detects whether the finger of the input person recognized by the image recognition unit touches a touch surface or not, the touch surface including a first touch surface that inputs the first input request information and is arranged by first distance from the display surface, and a second touch surface that inputs the second input request information and is arranged by second distance from the display surface;

wherein the second distance is shortened from the first distance, and wherein the second touch surface is arranged between the display surface and the first touch surface when the display information generator displays the first input request information and the second input request information on the display surface.

Apx2. The information input device according to Apx1, further comprising a storage device that stores information including the first distance and the second distance.

Apx3. The information input device according to Apx2, wherein the display information generator stores the information including the first distance and the second distance in the storage device, when the display information generator displays the first input request information and the second input request information on the display surface.

What is claimed is:

1. A method for an information input device, the method comprising:
    displaying one or more input requests on a first surface of the information input device;
    receiving, from a first operator, an input operation at a first position on a second surface of the information input device, wherein the second surface is formed over the first surface, and wherein the first position on the second surface corresponds to a second position on the first surface such that a straight line connecting the first position and the second position is perpendicular to the first surface;
    determining, as a first touch coordinate, a coordinate corresponding to the first position of the second surface;
    receiving, from a camera, an image of a first operator of the information input device, the image including a face of the first operator;
    extracting, from the received image, coordinate information of a face and eyes of the first operator;
    projecting a reference line along an image plane of the received image using the extracted coordinate information, wherein the reference line extends from a center of the received image towards a perimeter of the received image;
    projecting a hypothetical line along an image plane of the received image using the extracted coordinate information, wherein the hypothetical line extends from the center of the received image to a center of the face of the first operator;
    calculating an azimuth angle between the reference line and the hypothetical line;
    calculating a viewpoint direction of the first operator based on the calculated azimuth angle;
    correcting the second position on the first surface to a third position on the first surface by correcting the first touch coordinate into a coordinate of the third position based on 1) the calculated viewpoint direction and 2) distance information including a distance between the first surface and the second surface; and
    selecting, as first input information, a first input request of the one or more input requests that is displayed at the third position.

2. The method according to claim 1, wherein the calculated viewpoint direction toward the first surface is inclined from a perpendicular direction of the first surface.

3. The method according to claim 1, further comprising storing, in a storage device, the distance information.

4. The method according to claim 1, further comprising identifying the first operator based on the received image.

5. A method for an information input device, the method comprising:
    providing one or more input requests for display on a first surface of the information input device;
    receiving, from a first operator, an input operation at a first position on a second surface of the information input device, wherein the second surface is formed over the first surface, and wherein the first position on the second surface corresponds to a second position on the first surface such that a straight line connecting the first position and the second position is perpendicular to the first surface;
    receiving, from a second operator, an input operation at a fourth position on a third surface, wherein the third surface is formed over the first surface, wherein the fourth position on the third surface corresponds to a fifth position on the first surface such that a straight line connecting the fourth position and the fifth position is perpendicular to the first surface;
    calculating a viewpoint direction of the first operator from a captured image of the first operator;
    calculating a viewpoint direction of the second operator from a captured image of the second operator;
    correcting the second position on the first surface to a third position on the first surface based on the calculated viewpoint direction;
    correcting the fifth position on the first surface to a sixth position on the first surface based on the calculated viewpoint direction of the second operator;
    selecting, as first input information, a first input request of the one or more input requests that is displayed at the third position; and
    selecting, as second input information, a second input request of the one or more input requests that is displayed at the sixth position.

6. The method according to claim 5, wherein the calculated viewpoint directions of the first and the second operators toward the first surface are respectively inclined from a straight line that is perpendicular to the first surface.

7. The method according to claim 6,
    wherein the first input request displayed at the third position and the second input request displayed at the sixth position are same,
    wherein the second position and the fifth position are different, and
    wherein the third position and the sixth position are same.

8. The method according to claim 7,
    wherein the first surface includes a first region and a second region that does not overlap with the first region, and
    wherein the second position is included in the first region and the fifth position is included in the second region.

9. The method according to claim 8,
    wherein the third position is included in the second region, and
    wherein the sixth position is included in the first region.

10. The method according to claim 5,
    wherein the second position is corrected to the third position based on 1) the calculated viewpoint direction of the first operator and 2) first distance information including a distance between the first surface and the second surface, and
    wherein the fifth position is corrected to the sixth position based on 1) the calculated viewpoint direction of the second operator and 2) second distance information including a distance between distance between the first surface and the third surface.

11. The method according to claim 10, further comprising storing, in a storage device, the first and second distance information.

12. The method according to claim 10,
wherein correcting the second position to the third position by correcting first coordinates that include the first position into second coordinates that include the third position, and
wherein correcting the fifth position to the sixth position by correcting third coordinates that include the fourth position into fourth coordinates that include the sixth position.

13. The method according to claim 12, further comprising:
receiving, from a camera, images of the first and the second operators captured by the camera;
extracting coordinate information of faces and eyes of the first and the second operators from the captured images of the first operator and the second operator;
calculating the viewpoint directions of the first and the second operators from the extracted coordinate information; and
correcting the first and third coordinates into the second and fourth coordinates including the third and the sixth positions based on 1) the viewpoint directions of the first and the second operators and 2) the first and the second distance information.

* * * * *